United States Patent
Mundarath et al.

(10) Patent No.: US 8,184,750 B2
(45) Date of Patent: May 22, 2012

(54) TECHNIQUES FOR INCREASING DECODING RELIABILITY IN AN ADAPTIVE MINIMUM MEAN SQUARED ERROR WITH SUCCESSIVE INTERFERENCE CANCELLATION (MMSE/SIC) DECODER

(75) Inventors: Jayakrishnan C. Mundarath, Austin, TX (US); Ning Chen, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 681 days.

(21) Appl. No.: 12/358,039

(22) Filed: Jan. 22, 2009

(65) Prior Publication Data

US 2010/0183101 A1    Jul. 22, 2010

(51) Int. Cl.
*H04L 27/06* (2006.01)
*H04L 5/12* (2006.01)
*H03M 13/03* (2006.01)

(52) U.S. Cl. .................. 375/341; 375/262; 714/794
(58) Field of Classification Search ............. 375/240, 375/242, 253, 262, 265, 340, 341; 370/310, 370/344; 341/52, 56; 704/500, 503; 714/794, 714/795

See application file for complete search history.

(56) References Cited

U.S. PATENT DOCUMENTS

| | | | |
|---|---|---|---|
| 2007/0230382 A1 | 10/2007 | Ding et al. | |
| 2007/0237272 A1* | 10/2007 | Hwang et al. | 375/347 |
| 2008/0019434 A1 | 1/2008 | Kim et al. | |
| 2008/0069262 A1* | 3/2008 | Prasad et al. | 375/267 |
| 2009/0147887 A1* | 6/2009 | Bahng et al. | 375/340 |

* cited by examiner

*Primary Examiner* — Young T. Tse
(74) *Attorney, Agent, or Firm* — Yudell Isidore Ng Russell PLLC (57) ABSTRACT

A technique for increasing decoding reliability in an adaptive minimum mean squared error with successive interference cancellation (MMSE/SIC) decoder in a channel-coded multiple-input multiple-output (MIMO) communication system. A code block selector evaluates reliability metrics and determines whether the reliability metric of the decoded symbols of a particular indexed code block of a first code word satisfies a quality threshold. Depending upon this determination, a composite second code word is formed at each indexed code block using a previously calculated MMSE-LLR output of a second code word or a SIC-LLR output using the indexed symbols of a first code word. Composite second code word is decoded with increased accuracy.

20 Claims, 9 Drawing Sheets

FIG. 9

TECHNIQUES FOR INCREASING DECODING RELIABILITY IN AN ADAPTIVE MINIMUM MEAN SQUARED ERROR WITH SUCCESSIVE INTERFERENCE CANCELLATION (MMSE/SIC) DECODER

BACKGROUND

1. Field

This disclosure relates generally to wireless communications, and more specifically to techniques for increasing decoding reliability in an adaptive minimum mean squared error with successive interference cancellation (MMSE/SIC) decoder in a channel-coded multiple-input multiple-output (MIMO) communication system.

2. Related Art

There exist many techniques to share a communications channel among multiple users. Examples of these techniques include code division multiple access (CDMA), orthogonal frequency-division multiple access (OFDMA), time division multiple access (TDMA), and others. Moreover, techniques such as CDMA, OFDMA, and TDMA can be used in conjunction with a Multiple-Input/Multiple-Output (MIMO) system.

In MIMO systems, each of a plurality of data streams is individually encoded, modulated, and combined before being transmitted by multiple antennas. The combined data streams are then received at multiple antennas of a receiver. In some communications systems, such as CDMA, the multiple data streams from multiple users (or even a single user) are superposed on each other and received simultaneously at multiple antennas of the receiver.

Interference is generated from the superposition of these multiple data streams at the receiver. At the receiver, each data stream is separated, extracted, and decoded from the combined signal. This process is generally performed using an adaptive Minimum Mean Squared Error (MMSE) or MMSE-successive interference cancellation (SIC) algorithm. A MMSE algorithm is used for spatial filtering. The MMSE-SIC algorithm detects signal components or data streams one at a time by repeatedly applying the MMSE algorithm. While MMSE filtering can realize low complexity signal detection, the signal output by MMSE filtering suffers from interference by the other signals. To decode a particular data stream for a user, the data stream can be decoded by treating the other data streams as uncorrelated noise. A MMSE-SIC algorithm combines MMSE filtering and SIC to achieve improved Bit Error Rate (BER) performance. According to the SIC technique/algorithm, as each data stream is decoded it is reconstructed and fed back to subtract its contribution to the superposed or aggregated received signal before decoding of subsequent data streams. This technique can improve the utilization of a channel.

However, present techniques for SIC can be impractical to implement. For example, it can be time-consuming and computationally complex to evaluate a relatively large amount of data. This is particularly true in MIMO systems. In addition, SIC techniques can worsen interference when implemented in a high error rate environment. For example, a data stream that is improperly decoded and used in SIC has the potential for increasing the number of errors when decoding the next successive data stream. For these and other reasons, present techniques for SIC are inadequate.

BRIEF DESCRIPTION OF THE DRAWINGS

The present invention is illustrated by way of example and is not intended to be limited by the accompanying figures, in which like reference numerals indicate like elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although various embodiments are described below in conjunction with a subscriber station, such as a cellular handset, it will be appreciated that the present invention is not so limited and may be embodied in various devices, e.g., personal digital assistants (PDAs), digital cameras, portable storage devices, audio players, computer systems, and portable gaming devices, for example. Those skilled in the art will understand that the principles of the present disclosure may be implemented in any suitably arranged wireless receiver.

According to one embodiment of the present disclosure, a technique is disclosed for adaptive Minimum Mean Squared Error with Successive Interference Cancellation (MMSE/SIC) selection of Logarithmic Likelihood Ratio (LLR) code blocks based upon at least one code word from a group comprising a first and a second code word. The first and second code words correspond respectively to first and second signal streams. Each code word contains a respective plurality of indexed code blocks, wherein each of the plurality of indexed code blocks contains a plurality of MMSE-LLR values. The method includes generating an indexed composite code word corresponding to the second signal stream. The generating includes determining whether a reliability metric of decoded symbols of a particular indexed code block from a first code word satisfies a quality threshold. If the reliability metric satisfies the quality threshold, a plurality of SIC-LLR values corresponding in index to the second signal stream is stored within an indexed code block of the indexed composite code word. In this regard, the SIC-LLR values correspond in index to the particular indexed code block from the first code word, and are derived from the decoded symbols of the particular indexed code block from the first code word. If the reliability metric fails to satisfy the quality threshold, the plurality of MMSE-LLR values of the indexed code block of the second code word is stored in the indexed code block of the indexed composite code word corresponding to the second signal stream. The MMSE-LLR values correspond in index to the particular indexed code block.

According to another embodiment of the present disclosure, a wireless communication device (e.g., a base station (BS) or a subscriber station (SS)) includes a receiver and a processor coupled to the receiver. The processor is configured to generate an indexed composite code word of a second data stream. The processor is configured to determine whether a reliability metric of decoded symbols of a particular indexed code block from the first code word satisfies a quality threshold. If the reliability metric satisfies the quality threshold, the processor is configured for storing a plurality of SIC-LLR values of the second code word within an indexed code block of the indexed composite code word. Moreover, the SIC-LLR values correspond in index to the particular indexed code block. The SIC-LLR values are derived from the decoded symbols of the particular indexed code block. If the reliability metric fails to satisfy the quality threshold, the processor is configured for storing in the indexed code block of the indexed composite code word a plurality of MMSE-LLR values of an indexed code block of the second code word. The MMSE-LLR values correspond in index to the particular indexed code block.

According to another embodiment of the present disclosure, a computer program product is disclosed for adaptive Minimum Mean Squared Error with Successive Interference Cancellation (MMSE/SIC) selection of Logarithmic Likelihood Ratio (LLR) code blocks based upon at least one code word from a group comprising a first and a second code word. The first and second code words correspond respectively to first and second signal streams. Each code word contains a respective plurality of indexed code blocks, wherein each of the plurality of indexed code blocks contains a plurality of MMSE-LLR values. The computer program product includes a computer storage medium and program code on the computer storage medium that when executed provides the functions of generating an indexed composite code word corresponding to the second signal stream. The code for generating the indexed composite code word of the second data stream includes code for determining whether a reliability metric of decoded symbols of a particular indexed code block from a first code word satisfies a quality threshold. If the reliability metric satisfies the quality threshold, a plurality of SIC-LLR values corresponding in index to the second signal stream is stored within an indexed code block of the indexed composite code word. In this regard, the SIC-LLR values correspond in index to the particular indexed code block from the first code word, and are derived from the decoded symbols of the particular indexed code block from the first code word. If the reliability metric fails to satisfy the quality threshold, the plurality of MMSE-LLR values of the indexed code block of the second code word is stored in the indexed code block of the indexed composite code word corresponding to the second signal stream. The MMSE-LLR values correspond in index to the particular indexed code block.

According to another embodiment of the present disclosure, a technique for decoding a plurality of code words from a combined data signal in a multiple-input multiple-output (MIMO) system using minimum mean squared error with successive interference cancellation (MMSE/SIC) techniques includes receiving a combined data signal having multiple vector components of a first data stream and a second data stream. The vector components are buffered individually. Buffer storage is reduced by performing matrix multiplication of the vector components to obtain pre-processed versions of multiple communication channels. In this regard, the pre-processed versions are scalar terms. In response to the reduction in buffer storage, a first symbol stream estimate is determined. A plurality of Logarithmic Likelihood Ratios (LLRs) of the second data stream are determined, via successive interference cancellation (SIC) techniques, using the first symbol stream estimate and the scalar terms. The LLRs of the second data stream are outputted for decoding the plurality of code words from the combined data signal.

According to another aspect of the present disclosure, a communication device (e.g., a base station (BS) or a subscriber station (SS)) includes an input device and a circuit coupled to the input device. The circuit is configured to receive a combined data signal having multiple vector components of a first data stream and a second data stream. The circuit is also configured to buffer the vector components individually. Moreover, the circuit is configured to reduce buffer storage by performing matrix multiplication of the vector components to obtain pre-processed versions of multiple communication channels. In this regard, the pre-processed versions are scalar terms. In response to the reduction in buffer storage, the circuit is configured to determine a first symbol stream estimate. In addition, the circuit is configured to determine, via successive interference cancellation (SIC) techniques, a plurality of Logarithmic Likelihood Ratios (LLRs) of the second data stream, using the first symbol stream estimate and the scalar terms. The circuit is also configured to output the LLRs of the second data stream for decoding the plurality of code words from the combined data signal.

Figure 1:
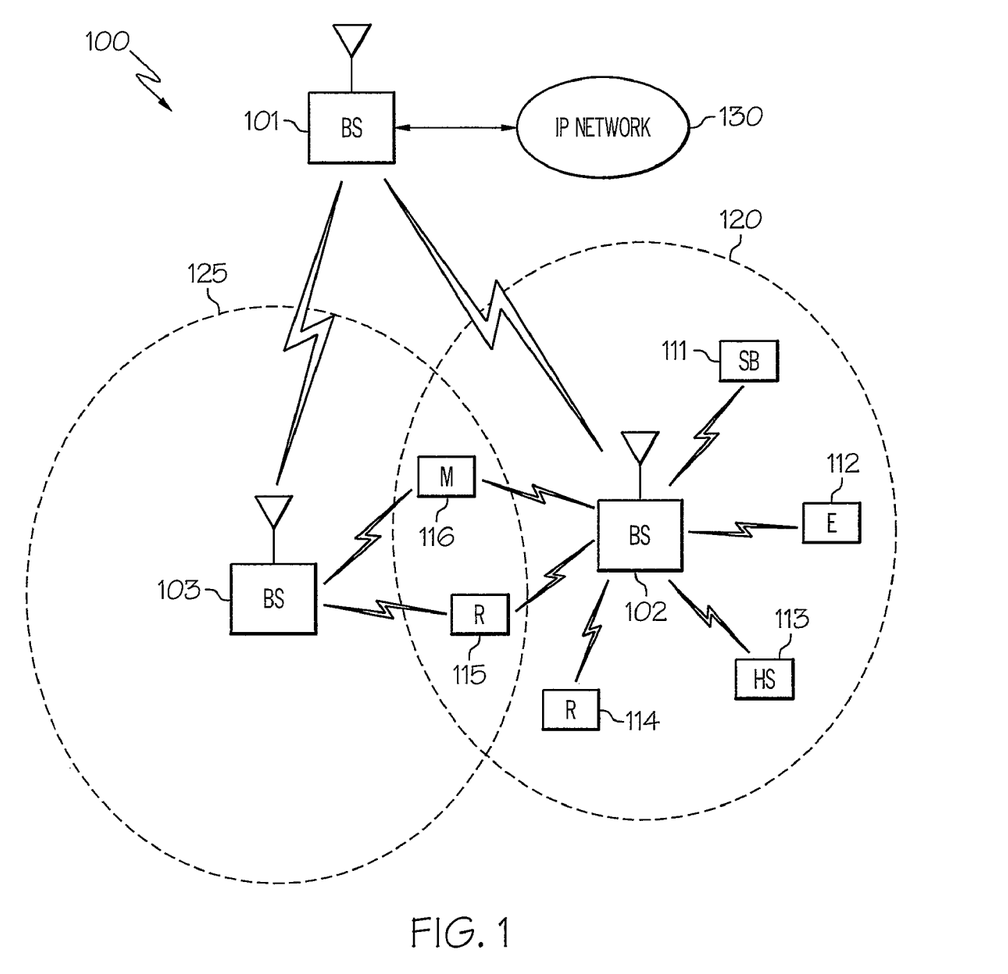
FIG. 1 is an exemplary wireless network that is capable of decoding data streams according to an embodiment of the present disclosure.

With reference to FIG. 1, an exemplary wireless network 100 that is capable of decoding data streams according to one embodiment of the present disclosure is illustrated. In the illustrated embodiment, wireless network 100 includes base stations (BS) 101-103. Base station 101 communicates with base station 102 and base station 103. Base station 101 also communicates with Internet protocol (IP) network 130, such as the Internet, a proprietary IP network, or other data network.

Base station 102 provides wireless broadband access to IP network 130, via base station 101, to a first plurality of subscriber stations within coverage area 120 of base station 102. The first plurality of subscriber stations includes subscriber stations (SS) 111-116. According to one exemplary embodiment of the disclosure, SS 111 may be located in a small business (SB), SS 112 may be located in an enterprise (E), SS 113 may be located in a WiFi hotspot (HS), SS 114 may be located in a first residence (R), SS 115 may be located in a second residence (R), and SS 116 may be a mobile (M) device.

Base station 103 provides wireless broadband access to IP network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using Orthogonal Frequency-Division Multiplexing (OFDM) and/or Orthogonal Frequency Division Multiple Access (OFDMA) techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

Subscriber stations 111-116 may use the broadband access to IP network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dashed lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment of the disclosure, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to IP network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to IP network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm.

Figure 2:
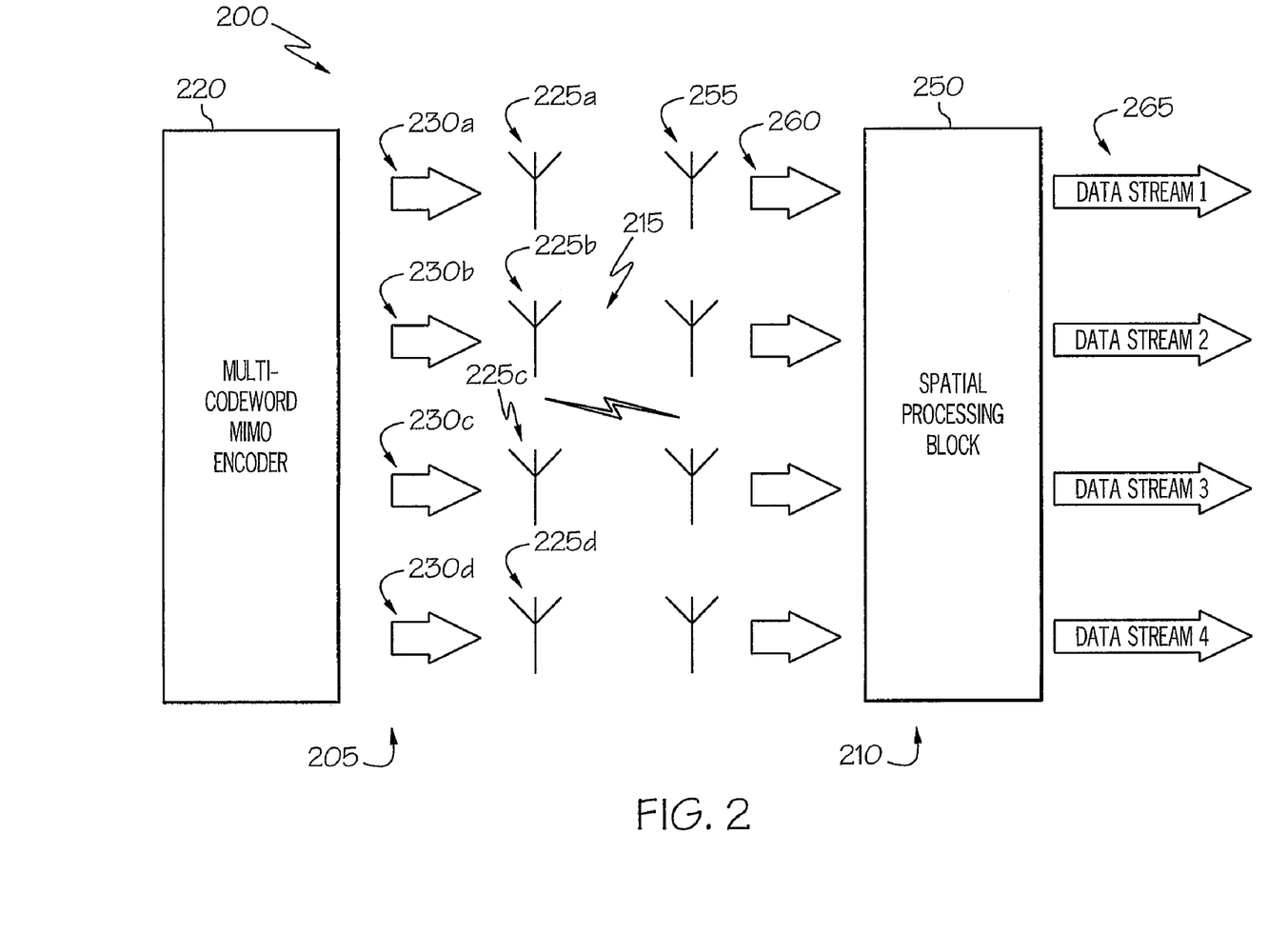
FIG. 2 illustrates a Multiple-Input Multiple-Output (MIMO) system that is capable of decoding data streams according to an embodiment of the present disclosure.

FIG. 2 illustrates a Multiple-Input Multiple-Output (MIMO) system 200 that is capable of decoding data streams according to an embodiment of the present disclosure. MIMO system 200 comprises a transmitter 205 and a receiver 210 that are operable to communicate over a wireless interface 215.

Transmitter 205 comprises a multi-codeword MIMO encoder 220 and a plurality of antennas 225a-225d. According to an embodiment of the present disclosure, each antenna 225a-225d transmits, respectively, a composite signal/combined data stream 230a-230d that includes different phase-shifted and amplified versions of each of the multiple data streams encoded using encoder 220. Receiver 210 comprises a spatial processing block 250 and a plurality of antennas 255, each of which is operable to receive a combined data stream 260 from a plurality of sources including antennas 225a-225d of transmitter 205. In this regard, combined data stream 260 includes a combination of the different data streams that are encoded by encoder 220. Spatial processing block 250 is operable to decode the combined data stream 260 into decoded data streams 265, which are substantially identical to the data streams encoded by encoder 220.

As described in more detail below in connection with FIGS. 4 through 6, spatial processing block 250 is operable to decode data streams 265 from the combined data stream 260 using an MMSE-SIC procedure that reduces the amount of buffer space that is required for SIC operation. Moreover, in connection with FIGS. 4 and 7-8, spatial processing block 250 is operable to decode data streams 265 from combined data stream 260 using an MMSE-SIC procedure that selects Logarithmic Likelihood Ratio (LLR) code blocks to form a composite code word corresponding to a second signal stream. The formation of composite code word is based upon the quality of a decoded first signal stream derived from a first code word, which includes a plurality of MMSE-LLR values. Each code word includes a respective plurality of indexed code blocks.

Figure 3:
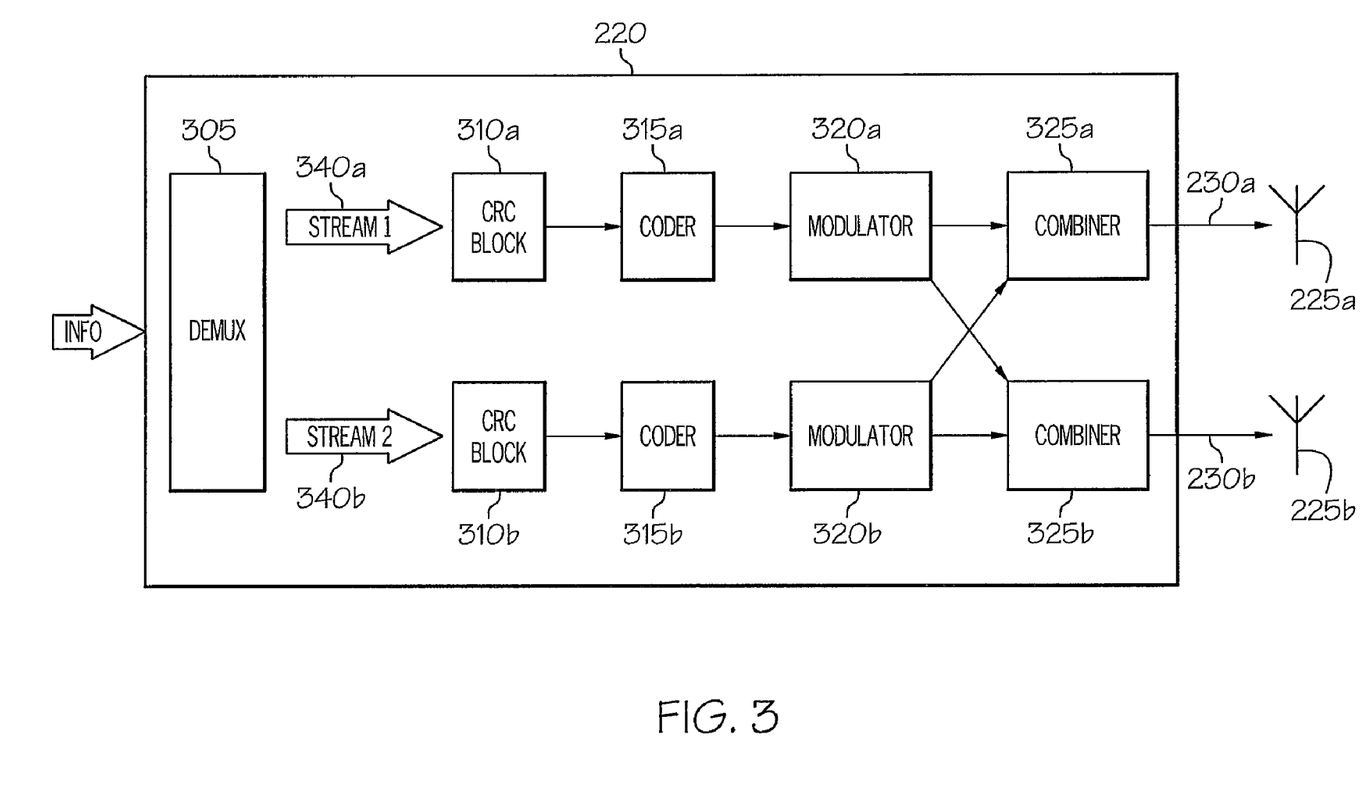
FIG. 3 illustrates details of the encoder of FIG. 2 according to an embodiment of the present disclosure.

FIG. 3 illustrates details of multi-codeword MIMO encoder 220 according to an embodiment of the present disclosure. For this embodiment, encoder 220 comprises a demultiplexer (demux) 305, a plurality of cyclic redundancy code (CRC) blocks 310, a plurality of coders 315, a plurality of modulators 320, and a plurality of combiner units 325. Encoder 220 is operable to receive an information block and to generate data streams 230 based on the information block for transmission over antennas 225. Although the illustrated embodiment shows two sets of components 310, 315, 320, and 325 to generate two data streams 230a-b for transmission by two antennas 225a-b, it will be understood that encoder 220 may comprise any suitable number of component sets 310, 315, 320, and 325 based on any suitable number of data streams 230 to be generated.

Demultiplexer 305 is operable to demultiplex the information block into a plurality of smaller information blocks, or streams 340a-b. Each CRC block 310a, 310b is operable to add CRC data to the associated information streams 340a, 340b, respectively. Following the addition of CRC data, each coder 315a, 315b is operable to respectively code the information stream 340a, 340b and each modulator 320a, 320b is operable to respectively modulate coded stream 340a, 340b. Each information stream 340a, 340b are then particularly combined using combiner units 325a, 325b. After coding, modulation, and combining, the combined data streams 230a and 230b are transmitted respectively from their separate antennas 225a and 225b.

Because encoder 220 is a multi-codeword MIMO encoder, different modulation and coding may be used on each of the individual information streams 340a-b. Thus, for example, coder 315a may perform different coding from coder 315b and modulator 320a may perform different modulation from modulator 320b. Using multiple code word transmission, a CRC check may optionally be performed on each of the received code words/data streams before the received code word/data stream is canceled from the overall combined signal/combined data stream 260 received at receiver 210. When this CRC check is performed, interference propagation may be avoided in the cancellation process by ensuring that only correctly received code words/data streams are canceled.

Figure 4:
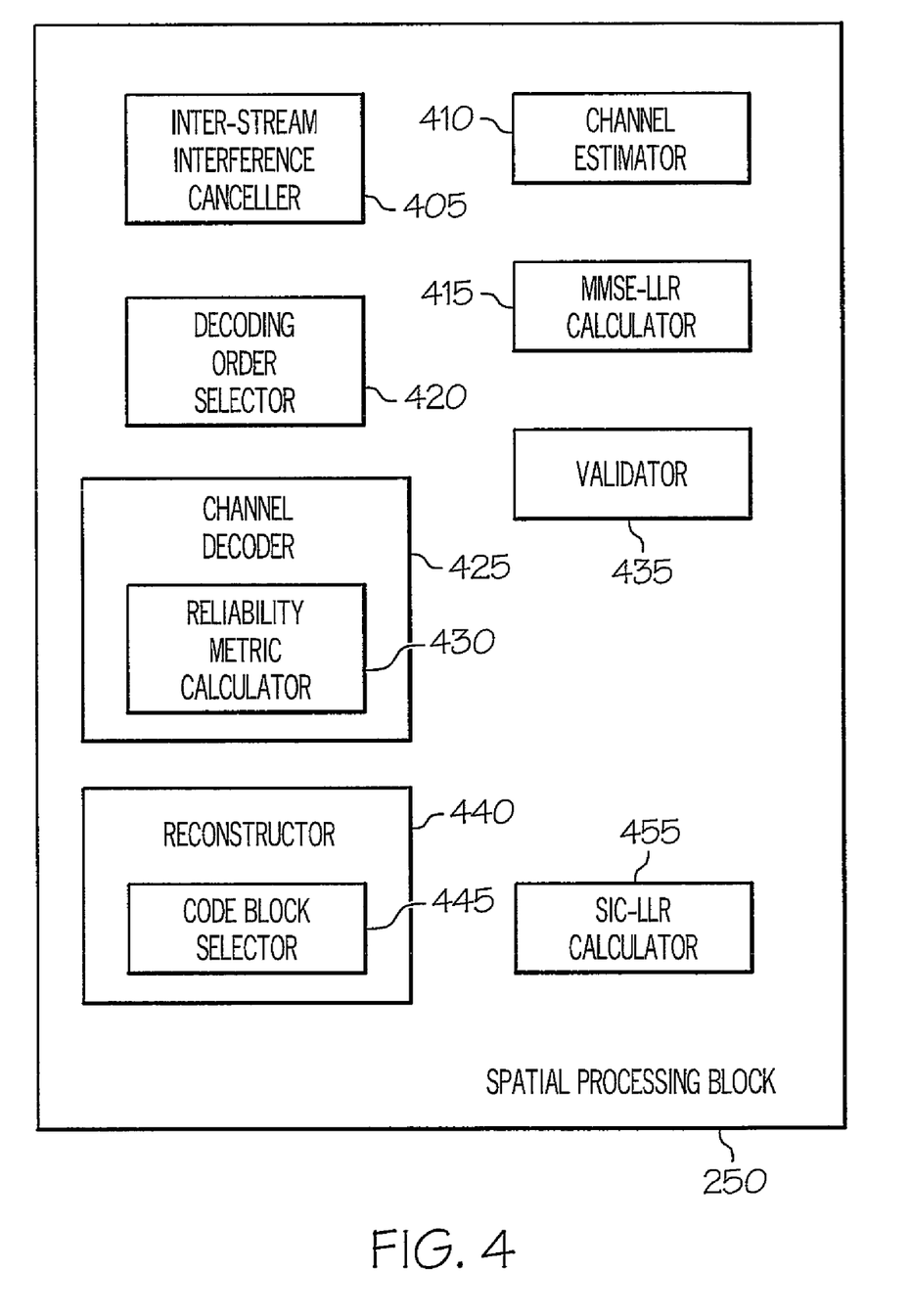
FIG. 4 illustrates details of the spatial processing block of FIG. 2 according to an embodiment of the present disclosure.

FIG. 4 illustrates details of spatial processing block 250 according to an embodiment of the present disclosure. For this embodiment, spatial processing block 250 comprises an optional inter-stream interference canceller 405, a channel estimator 410, an MMSE-LLR calculator 415, an optional decoding order selector 420, a channel decoder 425, a validator 435, a reconstructor 440, and a SIC-LLR calculator 455. It will be understood that spatial processing block 250 may comprise other components not illustrated in FIG. 4. In addition, although illustrated as separate components, it will be understood that any two or more of inter-stream interference canceller 405, channel estimator 410, MMSE-LLR calculator 415, decoding order selector 420, channel decoder 425, validator 435, reconstructor 440, and SIC-LLR calculator 455 may be implemented together as a single component without departing from the scope of the present disclosure.

Optional inter-stream interference canceller 405 is operable to cancel inter-stream interference received from transmitters other than transmitter 205. For a particular embodiment, inter-stream interference canceller 405 is operable to perform a Linear Minimum Mean Squared Error (LMMSE) operation to suppress inter-stream interference. Channel estimator 410 is operable to estimate the channels used for communication between transmitter 205 and receiver 210. Receiver 210 receives via antennas 255 multiple, combined data streams 260.

Minimum Mean Squared Error-Logarithmic Likelihood Ratio (MMSE-LLR) calculator 415 is operable to utilize the combined signal 260 that is received and to determine the LLR values (LLRs) for bits of each symbol in a plurality of encoded data streams of combined data streams 260 from the multiple receive antennas 255. The LLRs are encoded in a plurality of indexed code blocks within a plurality of code words. Each symbol is associated with a number of bits, depending on the type and order of the modulation. In this regard, each code word conventionally includes up to 1024 symbols per code block. However, it should be recognized that future standards may include more or less than 1024 symbols per code block. The LLR for a given bit is the relative measure of the likelihood that the bit is either logic 0 or a logic 1, which may correspond to an actual 0 and 1, or −1 and 1, respectively. The LLRs for the bits assist the channel decoder 425 in recovering the originally transmitted bits from transmitter 205. Decoding order selector 420 is operable to select an order for decoding data streams 265 to ensure that the strongest data stream is decoded first in advance of performing SIC.

Channel decoder 425 is operable to decode a data stream 265 (i.e., code word) based on the decoding order determined by decoding order selector 420. The output of channel decoder 425 is a decoded symbol stream of a first layer. Moreover, channel decoder 425 includes a reliability metric calculator 430 that is operable to determine a reliability metric of each decoded code block in data stream 265 for subsequent SIC operations. Validator 435 is operable to validate each of the decoded data streams 265. For example, validator 435 may be operable to perform a Cyclic Redundancy Check (CRC) on each stream 265 decoded by channel decoder 425 to verify that the decoded symbol stream is accurate.

Reconstructor 440 is operable to reconstruct the received signal in combined data stream 260 that corresponds to the data stream 265 decoded by channel decoder 425. Reconstructor 440 is operable to reconstruct the received signal based on the decoded stream 265 and the channel estimate provided by channel estimator 410 for the channel through which the signal was received. Reconstructor 440 includes a code block selector 445 that is operable to determine whether a reliability metric derived from reliability metric calculator 430 of the decoded symbols of a particular indexed code block from a first code word satisfies a quality threshold. The outcome of this reliability determination is used to determine the formation of a composite code word corresponding to a second data stream. The composite code word includes the LLRs associated with the second data stream (and additional data streams if the combined signal 260 includes more than two data streams).

SIC-LLR calculator 455 is operable to perform the successive interference cancellation (SIC) step. The SIC step subtracts and cancels indexed code blocks containing decoded symbols of the first code word from the combined data stream 260, resulting in a data stream in a second layer that includes the remaining undecoded portions of the combined data stream 260. In this regard, the data stream in the second layer contains the LLRs for the remaining undecoded portion of combined data stream 260.

According to an embodiment of the disclosure, SIC-LLR calculator 455 outputs the SIC-LLR values encoded in code blocks corresponding in index to particular indexed code blocks of a first data stream which have satisfied a quality threshold. The code blocks containing SIC-LLR values form part of the composite code word that is subsequently decoded using channel decoder 425, resulting in a stream of decoded symbols of a second layer. Thus, as each signal is reconstructed and canceled from the combined data stream 260, the combined data stream 260 comprises a fewer number of data streams 265 for decoding.

Thus, the composite code word can be formed from two different versions of LLRs: (a) LLRs corresponding to a second stream derived from the MMSE-LLR step and/or (b) LLRs corresponding to a second stream derived from the SIC-LLR step. If it is determined that the reliability metric of the decoded symbols of the particular indexed code block from the first code word satisfies the quality threshold, symbol stream code blocks corresponding in index to reliably decoded indexed MMSE-LLR code blocks from a first data stream 265 are selected and used in an intermediate SIC-LLR step. The SIC-LLR step subtracts the selected indexed MMSE-LLR code blocks of the first data stream from the received combined signal 260. The difference that is outputted from the SIC-LLR step is the LLR values corresponding in index to the second data stream. The SIC-LLR code blocks (derived from SIC-LLR calculator 455) corresponding to the second data stream are stored in index at the indexed code block LLR buffer of the indexed composite code word. On the other hand, if it is determined that the reliability metric of the decoded symbols of the particular indexed code block from the first code word fails to satisfy the quality threshold, the MMSE-LLR code blocks (derived from MMSE-LLR calculator 415) of second data stream 265 are retained and stored in index at the indexed code block LLR buffer of the indexed composite code word.

Figure 5:
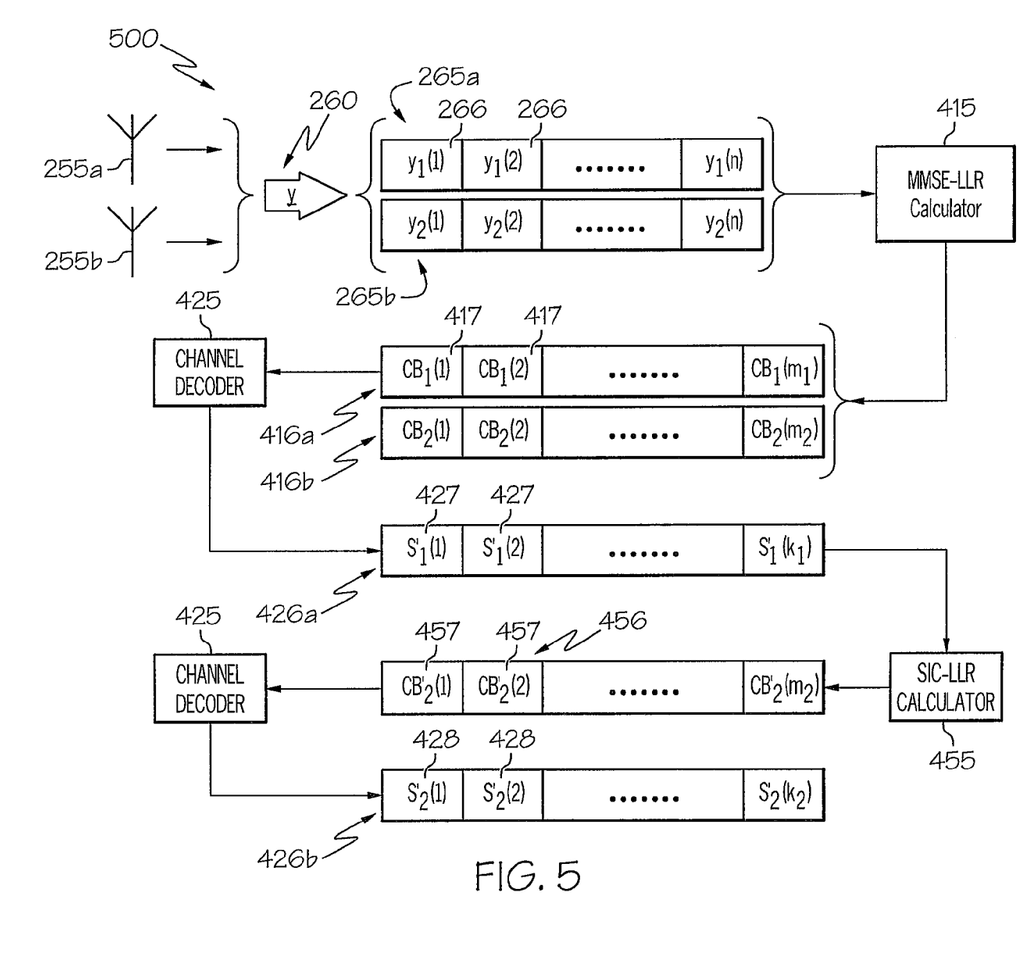
FIG. 5 is a functional block diagram of a relevant portion of an exemplary 2×2 MIMO Minimum Mean Squared Error-Successive Interference Cancellation (MMSE-SIC) system, configured according to an embodiment of the present disclosure.

FIG. 5 illustrates a system model for a MMSE-SIC receiver 500 within a basic 2×2 MIMO system. However, it should be recognized that the invention is not limited in this regard to a 2×2 MIMO system. For one example of a particular embodiment, MIMO system 200 may comprise a multi-codeword-modulation (MCM) M×N system, where M is the number of transmit antennas 225 and N is the number of receive antennas 255.

According to an embodiment of the disclosure, combined data signal stream 260 (received by antennas 255a-b), represented by the vector y, includes a first data stream 265a that is transmitted from antenna 225a and a second data stream 265b that is transmitted from antenna 225b. The signal vector, y, may be written as:

$$y = h_1 * s_1 + h_2 * s_2 + n \quad (1)$$

where $h_1$ and $h_2$ represent channel vectors for a first symbol stream, $s_1$, and a second symbol stream, $s_2$, respectively, and n represents a noise vector. Vector values y, $h_1$, $h_2$, and n are collectively referred to as vector components of combined data signal stream 260. The values of channel vectors $h_1$ and $h_2$ are estimated using channel estimator 410. In the case of an exemplary 2×2 MIMO system, there are a total of four different scalar channels that are conventionally stored in memory: $h_{11}$, $h_{12}$, $h_{21}$, $h_{22}$. Scalar channels $h_{11}$, $h_{12}$ correspond to channel vector $h_1$ and scalar channels $h_{21}$, $h_{22}$ correspond to channel vector $h_2$. In addition to the storing of scalar channels, the scalar components $y_1$ and $y_2$ of signal vector y are also conventionally stored in memory. Thus, for each time slot out of a total of n time slots, scalar values $h_{11}$, $h_{12}$, $h_{21}$, $h_{22}$, $y_1$, and $y_2$ are conventionally stored, for a total required buffer memory storage space of 6n. In a conventional 2×2 MIMO system, scalar values $h_{11}$, $h_{12}$, $h_{21}$, $h_{22}$, $y_1$, and $y_2$ are subsequently used to perform SIC operations, which are discussed in further detail below.

First data stream 265a and second data stream 265b each include a plurality of time domain signal samples 266, which number from a first signal sample to an nth signal sample. First data stream 265a and second data stream 265b are inputted into MMSE-LLR calculator 415. MMSE-LLR calculator 415 outputs the a first code word 416a (also expressed as LLRs for a first symbol stream, or $L(s_1)$) and a second code word 416b (also expressed as LLRs for a second symbol stream, or $L(s_2)$). First code word 416a and second code word 416b each include a plurality of indexed code blocks (CB) 417, which contain the LLR values. For example, first code word 416a includes code blocks 417 which number from a code block $CB_1(1)$ to an $m_1$th indexed code block $CB_1(m_1)$.

After selecting, via decoding order selector 420, which of first code word 416a and second code word 416b to select first for decoding, the selected code word (e.g., first code word 416a) is inputted into channel decoder 425. Channel decoder 425 outputs an estimated first symbol stream 426a that contains the estimated decoded symbols for first code word 416a. The estimated first symbol stream, $s'_1$, includes symbol stream blocks 427, which number from symbol stream block $s'_1(1)$ to a $k_1$th indexed symbol stream block $s'_1(k_1)$. It should be recognized, however, that channel decoder 425 outputs initially the decoded bits corresponding to first code word 416a. According to the embodiment of the disclosure, the decoded bits of first code word 416a are then inputted to a re-encoder/modulator (not shown), which re-encodes and modulates the bits, which results in the estimated first symbol stream 426a, or $s'_1$. The re-encoding and modulation is performed in advance of the SIC step. First symbol stream 426a is then inputted to SIC-LLR calculator 455.

Conventionally, SIC-LLR calculator 455 subtracts the decoded symbol stream 426a for each communication channel (i.e., scalar channel values $h_{11}$ and $h_{12}$) from the combined data signal stream 260. This first SIC step may be expressed as:

$$y - h_1 * s'_1 = h_2 * s_2 \quad (2)$$

where $h_2 * s_2$ represents the reduced combined signal stream, denoted y'. As can be appreciated, the value $s'_1$ for the estimated first symbol stream is required in order to arrive at the value for y'.

The second SIC step is to derive the LLRs for a second symbol stream $s_2$ (also referred to as $L(s_2)$), which is denoted by the scalar value, z. The scalar value z may be expressed as:

$$z = \alpha * h_2^H * y', \text{ or substituting for y'}, \quad (3)$$

$$z = \alpha * h_2^H * (y - h_1 * s'_1) \quad (4)$$

where α is a magnitude scaling factor that is based on the communication channels of the MIMO system, and $h_2^H$ is the Hermitian (complex-conjugate transpose) of $h_2$. As can be appreciated, conventional SIC techniques require a 6n memory buffer, since the scalar subcomponents $h_{11}$, $h_{12}$, $h_{21}$, $h_{22}$, $y_1$, and $y_2$ are required up to this stage to calculate z.

Thus, SIC-LLR calculator 455 outputs LLRs for an estimated second code word 456, having estimated LLRs in each estimated code block ($CB'_2$) 457 of estimated second code word 456. According to this embodiment of the disclosure, code blocks 457 number from a code block $CB'_2(1)$ to an $m_2$th indexed code block $CB'_2(m_2)$. Estimated second code word 456 is then decoded using channel decoder 425. Channel decoder 425 outputs an estimated second symbol stream 426b that contains the estimated decoded symbols (i.e. hence, containing decoded bits) for estimated second code word 456. If further undecoded portions of combined data stream remain, the decoded bits of second code word 456 are re-encoded and modulated, which outputs estimated second symbol stream, $s'_2$ for further SIC and decoding steps.

The estimated second symbol stream, $s'_2$, includes symbol stream blocks 428 which number from symbol stream block $s'_2(1)$ to a $k_2$th indexed symbol stream block $s'_2(k_2)$. If there are no additional portions of combined data stream 260 that have yet to be decoded, the decoded bits of first symbol stream 426a and second symbol stream 426b can then be used to perform additional post-decoding signal processing.

Figure 6:
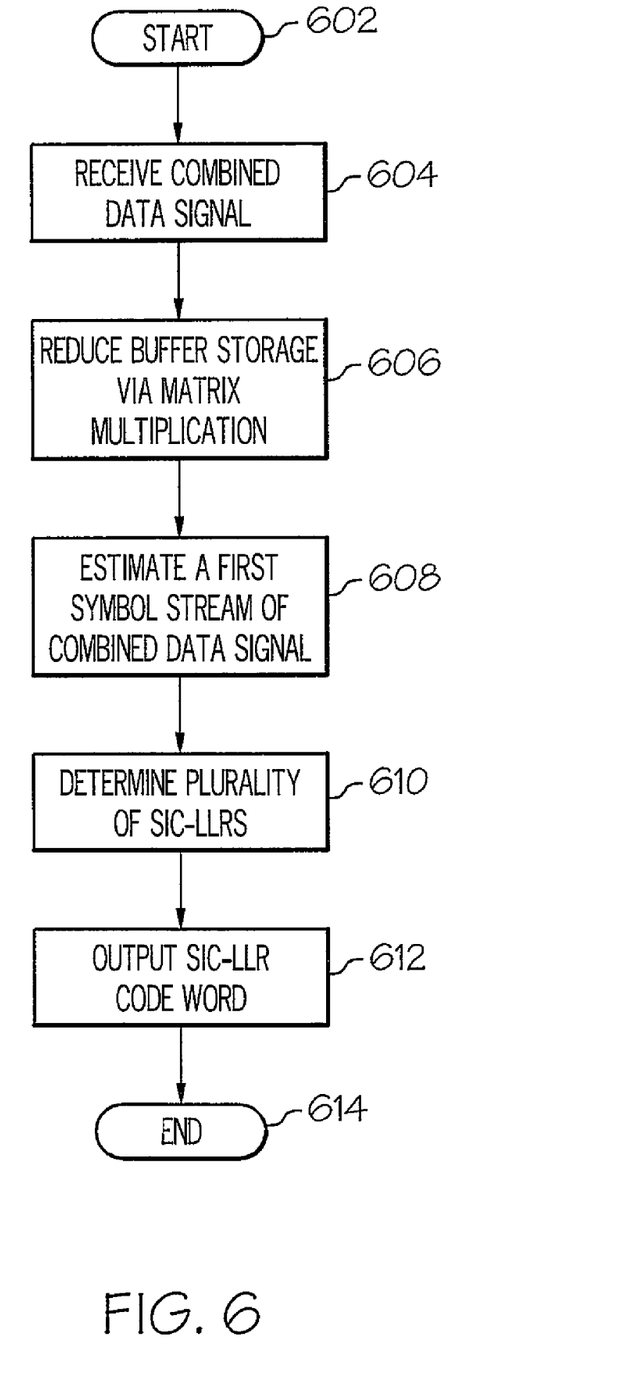
FIG. 6 is a flowchart of the buffer storage process associated with the MIMO MMSE-SIC system of FIG. 5.

Turning to FIG. 6, a method in a MIMO system for decoding a plurality of code words derived from a combined data signal using improved MMSE-SIC techniques is illustrated. For simplicity, the method shall be described within the context of a 2×2 MIMO system. However, it should be noted that the method can be implemented using any M×N MIMO system.

The process is initiated at block 602, at which point control transfers to block 604, where a combined data signal 260 is received having multiple vector components of first data stream and second data stream. Such vector components include, but are not limited to, a received vector signal, channel vectors, and noise vectors. Next, the values of channel vectors $h_1$ and $h_2$ are estimated using channel estimator 410. Since it is known from expression (4) that:

$$z = \alpha^* h_{2H}^*(y - h_1^* s'_1) \quad (4),$$

then it is possible to distribute expression (4) as follows:

$$z = (\alpha^* h_2^H {}^* y) - (\alpha^* h_2^H {}^* h_1)^* s'_1 \quad (5), \text{ or}$$

$$z = z_1 - z_2 * s'_1 \quad (6)$$

where $z_1 = (\alpha^* h_2^H {}^* y)$ and $z_2 = (\alpha^* h_2^H {}^* h_1)$

Then, in block 606 buffer storage is reduced by performing a matrix multiplication of the vector components (i.e., specifically $h_2^H {}^* y$ and $h_2^H {}^* h_1$) to obtain pre-processed versions of multiple communication channels, which are stored as scalar terms $z_1$ and $z_2$. It can be appreciated that at this point in the process, the buffer memory requirements for an exemplary 2×2 MIMO system for subsequent SIC processing is reduced from 6n as shown as required for conventional SIC operations, to a buffer memory requirement of 2n attributed to scalar storage.

At block 608, in response to reducing the buffer storage as described in block 606, an estimated first symbol stream 426a of combined data signal 260 is determined. This is achieved by first (a) inputting first data stream 265a and second data stream 265b into MMSE-LLR calculator 415 to output the LLRs of a first code word 416a (e.g., $L(s_1)$) and a second code word 416b (e.g., $L(s_2)$), (b) using decoding order selector 420 for selecting a code word among first code word 416a or second code word 416b to be first decoded, (c) decoding the selected code word (e.g., first code word using $L(s_1)$) into its corresponding bits, and (d) re-encoded and modulated the corresponding bits to determine a first symbol stream estimate (e.g., $s'_1$) of combined data signal 260.

At block 610, a plurality of LLRs of a second data stream is determined via SIC techniques. This is achieved by using the stored scalar values $z_1$ and $z_2$ and the estimated first symbol stream 426a within expression (6). Next, in block 612, the LLRs of the second data stream are outputted from SIC-LLR calculator 455 and then decoded via channel decoder 425. Following block 612, control transfers to block 614 where the process terminates.

Figure 7:
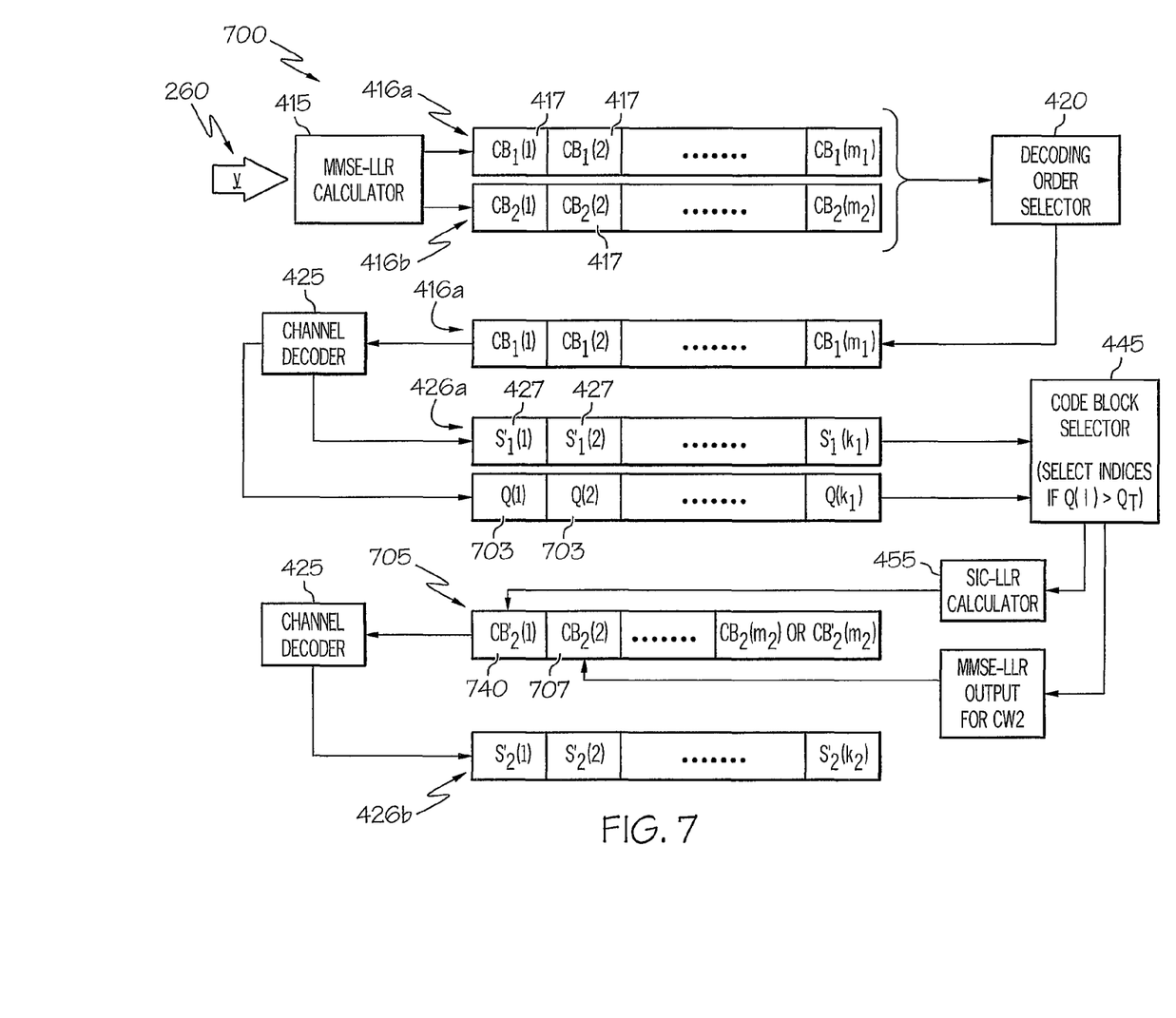
FIG. 7 is a functional block diagram of an exemplary 2×2 MIMO adaptive MMSE-SIC Logarithmic Likelihood Ratio (LLR) code block selection system, configured according to one embodiment of the present disclosure.

With reference now to FIG. 7, a functional block diagram of an exemplary 2×2 MIMO adaptive MMSE-SIC LLR code block selection system 700 is illustrated, according to another embodiment of the present disclosure.

According to an embodiment of the disclosure, combined data signal stream 260, represented by the vector y, is inputted into MMSE-LLR calculator 415. MMSE-LLR calculator 415 outputs a first code word 416a and a second code word 416b containing the LLRs in each code block of first code word 416a and second code word 416b, respectively. First code word 416a and second code word 416b each include a plurality of indexed code blocks (CB) 417. For example, first code word 416a includes code blocks 417 which number from a code block $CB_1(1)$ to an $m_1$th indexed code block $CB_1(m_1)$.

After selecting, via decoding order selector 420, which of first code word 416a and second code word 416b to select first for decoding, the selected code word (e.g., first code word 416a) is inputted into channel decoder 425. Channel decoder 425, using re-encoder/modulator (not shown), outputs an estimated first symbol stream 426a that contains the estimated decoded symbols for first code word 416a. The estimated first symbol stream, $s'_1$, includes symbol blocks 427, which number from symbol block $s'_1(1)$ to a $k_1$th indexed symbol block $s'_1(k_1)$.

In addition, channel decoder 425 includes a reliability metric calculator 430 that is operable to determine a reliability metric 703 of each decoded code block in data stream 265 for subsequent SIC-LLR operations performed by SIC-LLR calculator 455, if applicable. Reliability metric calculator generates multiple reliability or quality metrics 703, $Q(k_1)$, which corresponds in index to each symbol block 427. First symbol stream 426a and its corresponding reliability metrics 703 are then inputted to code block selector 445.

Code block selector 445 determines whether a reliability metric 703, corresponding in index to a particular indexed code block 417 of selected first code word 416a, satisfies a quality threshold, $Q_T$. The reliability metric is based on a decoding accuracy of at least one code word used for decoding a subsequent code word. For example, the reliability metric can measure: the CRC status for each code block, a cumulative magnitude metric for the LLRs contained in the code block, etc. According to one exemplary embodiment, code block selector 445 selects one or more first symbol blocks 427 which correspond in index $k_1$ to a reliability metric $Q(k_1)$ that is greater than $Q_T$. As a result, those selected first symbol block(s) 427 are inputted to SIC-LLR calculator 455. SIC-LLR calculator 455 outputs one or more estimated second code blocks 740 (estimated values are denoted by an apostrophe symbol, such as CB') corresponding to the selected indices having reliability metrics 703 which are determined to satisfy $Q_T$. However, if the reliability metric 703 of a particular index $k_1$ fails to satisfy quality threshold $Q_T$, then code block selector 445 will select previously outputted code blocks 417 from second code word 416b (i.e. containing MSE-LLR output of second code word 416b) for storage within corresponding indices of indexed composite code word 705.

The estimated second code blocks 740 corresponding to the selected indices, as well as code blocks 707 corresponding to the previously obtained MMSE-LLR second code blocks 417 corresponding to the non-selected indices together form part of indexed composite code word 705. To better illustrate how composite code word 705 is constructed, the following example is presented. For example, if code block selector 445 determines that for index 1, the reliability metric $Q(1)$ satisfies $Q_T$, then the corresponding symbol block at index 1, $s'_1(1)$, is selected for use in calculating the LLRs of the second stream via SIC-LLR calculator 455. The output of this SIC-LLR step are LLRs which are stored within code block labeled $CB'_2(1)$ of indexed composite code word 705. Moving to the next index for consideration (i.e., index 2), code block selector 445 may determine in one exemplary embodiment that the reliability metric Q(2) fails to satisfy $Q_T$. If Q(2) does not satisfy $Q_T$, this indicates that the symbol block of index 2, $s'_1(2)$, cannot be reliably used to derive an estimated code block $CB'_2(2)$ via SIC-LLR calculator 455. Instead, the outputted MMSE-LLR value earlier derived from MMSE-LLR calculator 415 for the corresponding index (i.e., index 2) is stored as $CB_2(2)$ of indexed composite code word 705.

Indexed composite code word 705 is reconstructed using reconstructor 440. Once the indexed composite word 705 has been reconstructed, indexed composite word 705 is then decoded using channel decoder 425. Channel decoder 425 outputs estimated second symbol stream 426b that contains the estimated decoded symbols (i.e. hence, decoded bits) for estimated second code word 456. As mentioned earlier, the decoded bits of first symbol stream 426a and second symbol stream 426b can then be used to perform additional post-decoding signal processing.

Figure 8:
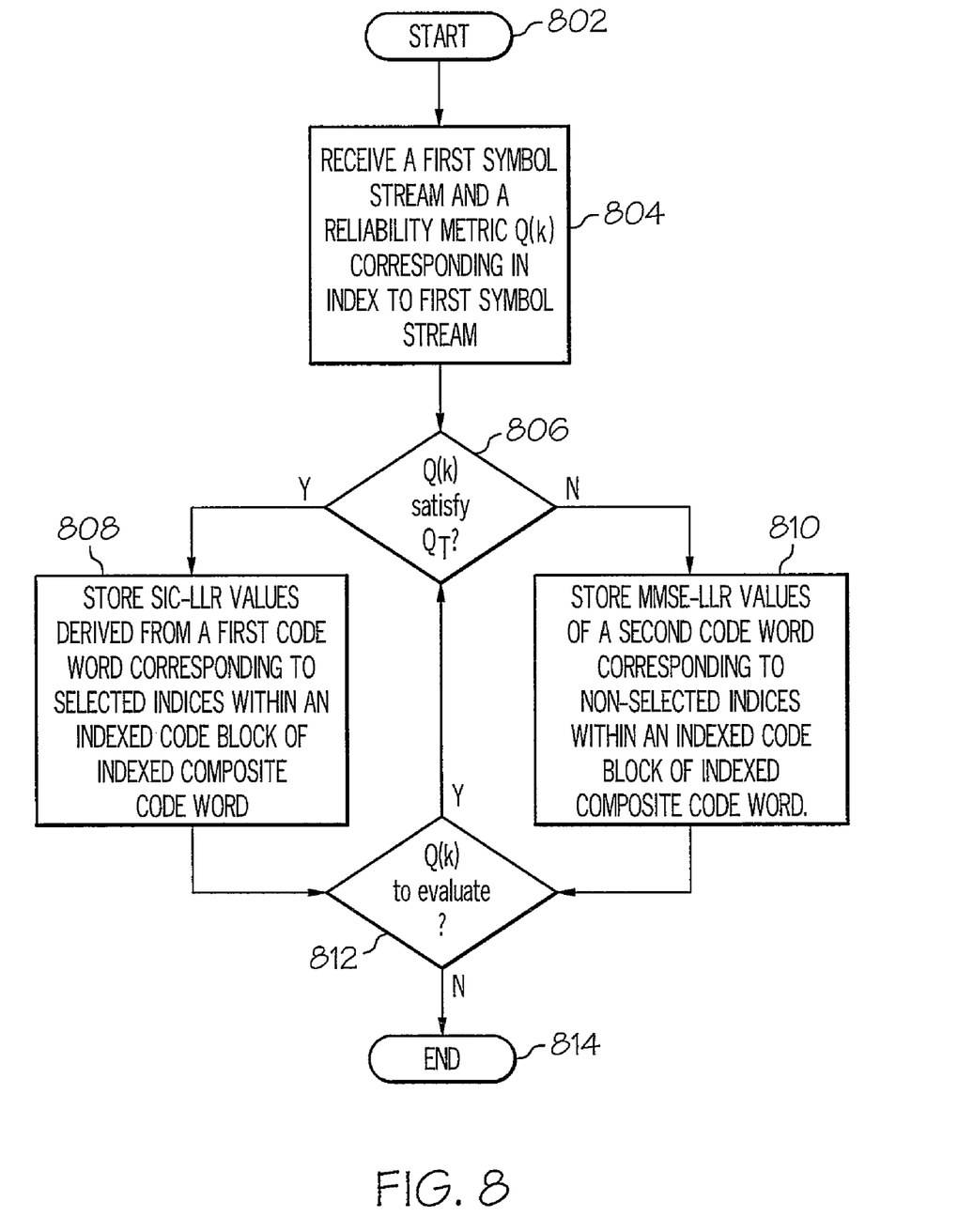
FIG. 8 is a flowchart of the LLR code block selection process associated with the MIMO adaptive MMSE-SIC LLR code block selection system of FIG. 7.

Turning to FIG. 8, a method of selecting LLR code blocks associated with the MIMO adaptive MMSE-SIC LLR code block selection system is illustrated. For simplicity, the method shall be described within the context of a 2×2 MIMO system. However, it should be noted that the method can be implemented using any M×N MIMO system.

The process is initiated at block 802, at which point control transfers to block 804, where code block selector 445 receives a first estimated symbol stream 426a and a corresponding reliability metric 703, or Q(k), corresponding in index to particular indexed symbol block 427 that is derived from a particular indexed code block of selected first code word 416a.

From block 804, the process proceeds to decision block 806, where it is determined whether reliability metric 703 satisfies a quality threshold, $Q_T$. If it is determined that reliability metric 703 satisfies $Q_T$, the process proceeds to block 808, where a plurality of SIC-LLR values are stored within an indexed code block (e.g., indexed code block 740) of indexed composite code word 705. In this regard, the SIC-LLR values correspond in index to the particular indexed code block from first code word 416a and are derived from the decoded symbols of the particular indexed code block from first code word 416a. However, if it is determined that reliability metric 703 fails to satisfy $Q_T$, the process proceeds to block 810, where a plurality of MMSE-LLR values of indexed code block 417 of the second code word 416b is stored in the indexed code block (e.g., code block 707) of indexed composite code word 705. In this regard, the MMSE-LLR values of the indexed code block 417 of the second code word 416b correspond in index to the particular indexed code block from first code word 416a. From blocks 808 and 810, the process continues to decision block 812, where it is determined whether reliability metrics for additional indices remain. If additional indices remain, the process returns to decision block 806. Otherwise, control transfers to block 814 where the process terminates.

Figure 9:
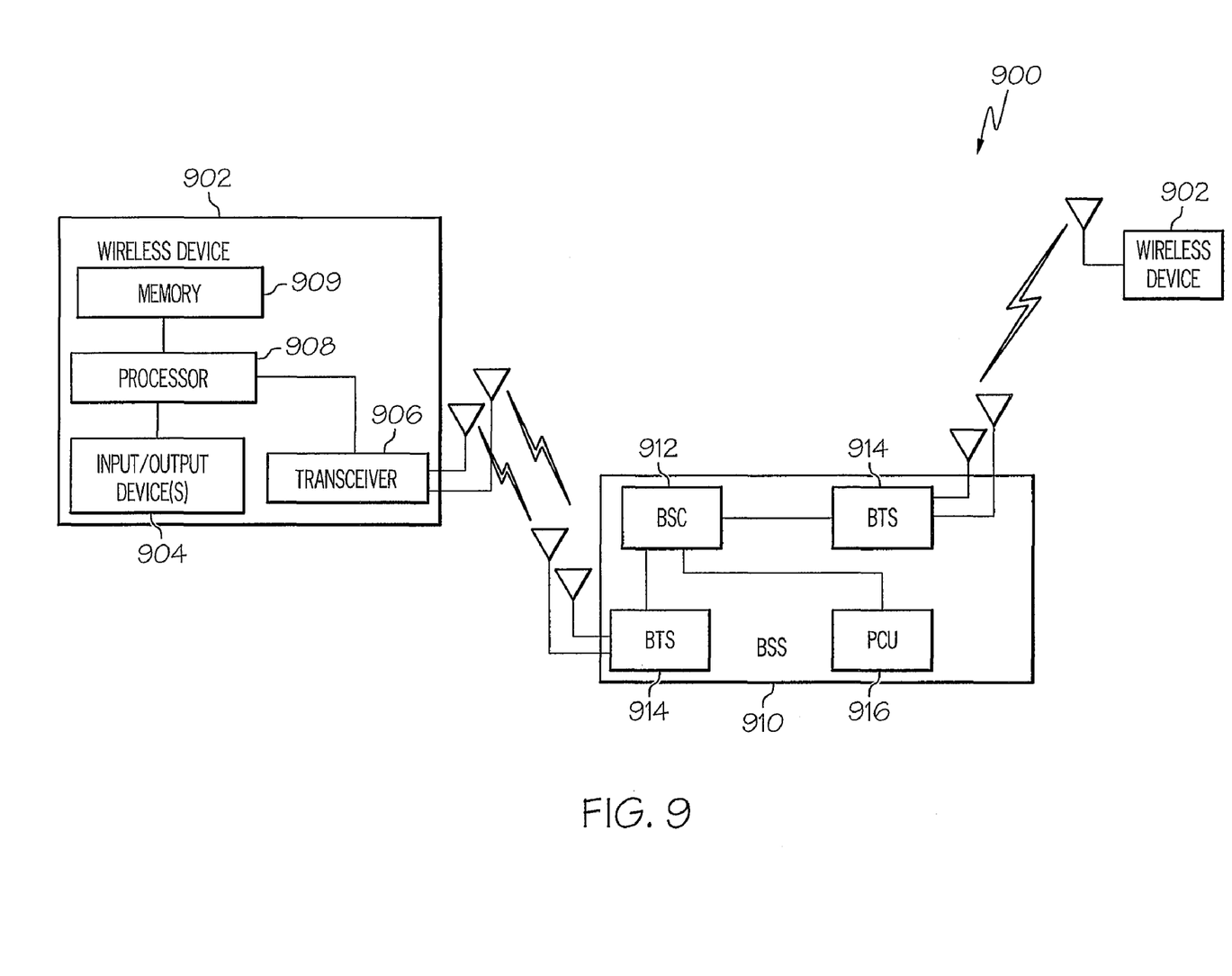
FIG. 9 is a block diagram of an exemplary subscriber device within a MIMO wireless communication system that may be configured according to one or more embodiments of the present disclosure.

With reference to FIG. 9, an example wireless communication system 900 is depicted that includes a plurality of wireless devices 902 (subscriber stations SS 111-116), e.g., hand-held computers, personal digital assistants (PDAs), cellular telephones, etc., that may be configured to reduce buffer memory requirements and/or to increase MMSE/SIC decoding reliability in a MIMO system according to the present disclosure. That is, the wireless devices 902 may include receivers that are configured according to FIGS. 4, 5, and 7.

In general, the wireless devices 902 include a processor 908 (e.g., a digital signal processor (DSP)) that employs a software system that is stored in memory 909, a transceiver 906, and one or more input/output device 904 (e.g., a camera, a keypad, a display, etc.), among other components not shown in FIG. 9. It should be appreciated that the blocks within a receiver may correspond to hardware or software (or a combination of software and hardware) that is executed on processor 908 having one or more execution units. As a preparatory step to practicing the invention in software, the computer programming code (whether software or firmware) according to a preferred embodiment will typically be stored in one or more computer readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more computer-readable storage devices containing the code according to the present invention with appropriate standard computer hardware to execute the code contained therein. An apparatus for practicing the invention could be one or more computers and storage systems containing or having network access to computer program(s) coded in accordance with the invention.

The wireless devices 902 communicate with a base station controller (BSC) 912 of base stations (BS) 102, 103, via one or more base transceiver stations (BTS) 914, to receive or transmit, control signals, voice, and data. The BSC 912 may, for example, be configured to schedule communications for wireless devices 902. Alternatively, BTS 914 may schedule communications for wireless devices 902 in which BTS 914 is in communication. In either case, a scheduler typically employs one or more processors (that execute a software system) to schedule communications.

Accordingly, a number of techniques have been disclosed herein that generally reduce buffer memory requirements and increase MMSE/SIC decoding reliability in a MIMO system. It is contemplated that the techniques described herein may be advantageously employed in various communication systems (both wired and wireless) that comply with a number of different standards.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the present disclosure may be embodied as a method, wireless communication device, or computer program product. Moreover, the processes in preferred embodiments of the present invention may be implemented using any combination of software, firmware or hardware. For example, software that implements the process 400 of FIG. 4 may be executed by a BS and/or an SS. As a preparatory step to practicing the invention in software, code (whether software or firmware) according to a preferred embodiment will typically be stored in one or more computer-readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a hard disk, random access memory (RAM), etc. The method form of the invention may be practiced by combining one or more computer-readable storage devices containing the code according to the present disclosure with appropriate standard processing hardware to execute the code contained therein. An apparatus for practicing the techniques of the present disclosure could be one or more BSs and/or SSs that access code in accordance with the present disclosure.

Furthermore, the present disclosure may take the form of a computer program product on a tangible computer-readable storage medium having computer-usable program code embodied in the storage medium processible by a computer. Computer program code for carrying out operations of the present invention may be written in an object oriented programming language such as JAVA®, Smalltalk® (SMALL-TALK is a trademark or registered trademark of Cincom Systems, Inc.), C++ or the like. However, the computer program code for carrying out operations of the present disclosure may also be writing in conventional procedural programming languages, such as the "C" programming language or similar programming languages.

Although the invention is described herein with reference to specific embodiments, various modifications and changes can be made without departing from the scope of the present invention as set forth in the claims below. For example, the techniques disclosed herein are generally broadly applicable to receivers, irrespective of location, in a communication system. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The present disclosure is described with reference to flowchart illustrations and/or block diagrams of methods, apparatuses (wireless communication devices) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

What is claimed is:

1. A method of selection of Logarithmic Likelihood Ratio (LLR) code blocks based upon first and second code words each containing a respective plurality of indexed code blocks, wherein each of said plurality of indexed code blocks containing a plurality of Minimum Mean Squared Error (MMSE)-LLR values, the method comprising:
generating an indexed composite code word of a first data stream, wherein said generating includes:
decoding symbols of a first indexed code block from said first code word;
determining whether a reliability metric of said decoded symbols of said first indexed code block from said first code word satisfies a quality threshold;
if said reliability metric satisfies said quality threshold, storing a plurality of Successive Interference Cancellation (SIC)-LLR values of said second code word within an indexed code block of said indexed composite code word, wherein said SIC-LLR values correspond in index to said first indexed code block, and wherein said SIC-LLR values are derived from said decoded symbols of said first indexed code block; and
if said reliability metric fails to satisfy said quality threshold, storing in said indexed code block of said indexed composite code word a plurality of MMSE-LLR values of a second indexed code block of said second code word, wherein said MMSE-LLR values of the second indexed code block correspond in index to said first indexed code block.

2. The method of claim 1, wherein said reliability metric is generated by a channel decoder.

3. The method of claim 1, wherein said reliability metric is based on a decoding accuracy of at least one code word used for decoding a subsequent code word.

4. The method of claim 1, wherein each of the first and the second code words includes up to 1024 symbols per code block of each respective plurality of indexed code blocks.

5. The method of claim 1, further comprising:
decoding said indexed composite code word; and
outputting the decoded symbols of the first indexed code block from said indexed composite code word.

6. The method of claim 1, wherein said indexed composite code word is formed by overwriting at least one indexed code block of said second code word if said reliability metric corresponding in index to said at least one indexed code block of said second code word satisfies the quality threshold.

7. The method of claim 1, further comprising:
receiving a combined data signal having multiple vector components of the first data stream and a second data stream;
buffering said vector components individually; and
reducing buffer storage by performing matrix multiplication of said vector components to obtain pre-processed versions of multiple communication channels, wherein said pre-processed versions are scalar terms.

8. The method of claim 7, further comprising:
in response to said reducing buffer storage, determining a symbol stream estimate of said combined data signal;
determining, via successive interference cancellation (SIC) techniques, a plurality of Logarithmic Likelihood Ratios (LLRs) of said second data stream using said symbol stream estimate and said scalar terms; and outputting said LLRs of said second data stream for decoding said combined data signal.

9. A wireless communication device, comprising:
a receiver; and
a processor coupled to said receiver, wherein said processor is configured to:
   generate an indexed composite code word of a data stream, wherein said generating includes:
      decoding symbols of a first indexed code block from a first code word;
      determining whether a reliability metric of the decoded symbols of the first indexed code block from the first code word satisfies a quality threshold;
      if said reliability metric satisfies said quality threshold, storing a plurality of Successive Interference Cancellation Logarithmic Likelihood Ratio (SIC-LLR) values of a second code word within an indexed code block of said indexed composite code word, wherein said SIC-LLR values correspond in index to said first indexed code block, and wherein said SIC-LLR values are derived from said decoded symbols of said first indexed code block; and
      if said reliability metric fails to satisfy said quality threshold, storing in said indexed code block of said indexed composite code word a plurality of Minimum Mean Squared Error Logarithmic Likelihood Ratio (MMSE-LLR) values of a second indexed code block of said second code word, wherein said MMSE-LLR values correspond in index to said first indexed code block.

10. The wireless communication device of claim 9, wherein said reliability metric is generated by a channel decoder.

11. The wireless communication device of claim 9, wherein said reliability metric is based on a decoding accuracy of at least one code word used for decoding a subsequent code word.

12. The wireless communication device of claim 9, wherein each of the first and the second code words includes up to 1024 symbols per code block of each respective plurality of indexed code blocks.

13. The wireless communication device of claim 9, wherein the processor is further configured to:
   decode said indexed composite code word; and
      output the decoded symbols of the first indexed code block from said indexed composite code word.

14. The wireless communication device of claim 9, wherein said indexed composite code word is formed by overwriting at least one indexed code block of said second code word if said reliability metric corresponding in index to said at least one indexed code block of said second code word satisfies the quality threshold.

15. A computer program product, comprising:
a non-transitory computer-readable storage medium; and
program code on the computer-readable storage medium that when executed by a processor to provide instructions of:
   generating an indexed composite code word of a data stream, wherein the code for generating the indexed composite code word of the data stream includes code for:
   decoding symbols of a first indexed code block from a first code word;
      determining whether a reliability metric of the decoded symbols of the first indexed code block from said first code word satisfies a quality threshold;
      if said reliability metric satisfies said quality threshold, storing a plurality of Successive Interference Cancellation Logarithmic Likelihood Ratio (SIC-LLR) values of a second code word within an indexed code block of said indexed composite code word, wherein said SIC-LLR values correspond in index to said first indexed code block, and wherein said SIC-LLR values are derived from said decoded symbols of said first indexed code block; and
      if said reliability metric fails to satisfy said quality threshold, storing in said indexed code block of said indexed composite code word a plurality of Minimum Mean Squared Error Logarithmic Likelihood Ratio (MMSE-LLR) values of a second indexed code block of said second code word, wherein said MMSE-LLR values correspond in index to said first indexed code block.

16. The computer program product of claim 15, wherein said reliability metric is generated by a channel decoder.

17. The computer program product of claim 15, wherein said reliability metric is based on a decoding accuracy of at least one code word used for decoding a subsequent code word.

18. The computer program product of claim 15, wherein each of the first and the second code words includes up to 1024 symbols per code block of each respective plurality of indexed code blocks.

19. The computer program product of claim 15, wherein the program code further provides the instructions of:
   decoding said indexed composite code word; and
   outputting the decoded symbols of the first indexed code block from said indexed composite code word.

20. The computer program product of claim 15, wherein said indexed composite code word is formed by overwriting at least one indexed code block of said second code word if said reliability metric corresponding in index to said at least one indexed code block of said second code word satisfies the quality threshold.

* * * * *